March 18, 1952  A. DVOŘÁK  2,589,931
X-RAY ANALYSIS OF MATERIALS
Filed Dec. 14, 1949
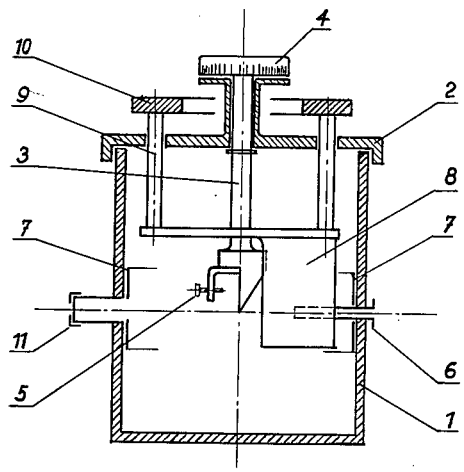
Fig.1
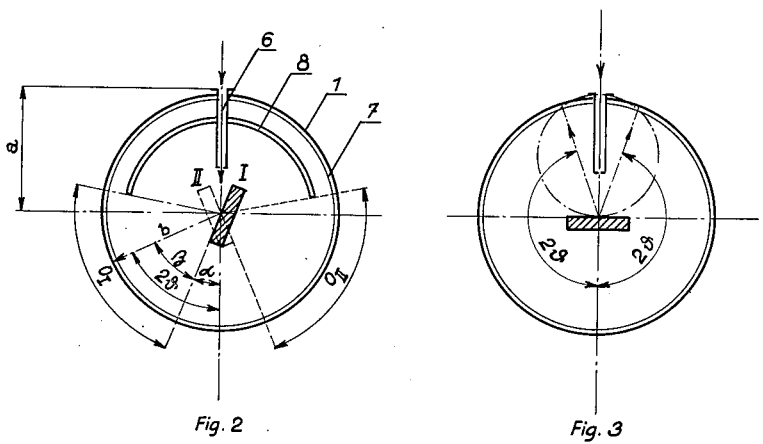
Fig. 2
Fig. 3
*INVENTOR.*
ALOIS DVOŘÁK
BY
*AGENT*

UNITED STATES PATENT OFFICE 2,589,931

X-RAY ANALYSIS OF MATERIALS

Alois Dvořák, Prague, Czechoslovakia, assignor of one-half to Chirana, národni podnik, Prague, Czechoslovakia, a national corporation of Czechoslovakia Application December 14, 1949, Serial No. 132,827
In Czechoslovakia June 5, 1947

4 Claims. (Cl. 250—53)

The radiographic methods so far used have some disadvantages, especially when analyzing the fine structure of metals and alloys. While the powder analysis (Debye-Scherrer), which uses the material to be analysed in elongated form, makes it possible to record all interference lines, it requires, however, that the material be analysed in powder or wire form. This makes it impossible to determine the structure in a larger piece of material. This drawback is especially noticeable when dealing with heat-treated alloys, with regard to different speeds of heating and cooling of a larger piece of wire, to different states of internal strain, to different sizes of grains, etc.

Additionally, there is also the difficulty to prepare powders or rods from very hard or very soft alloys.

On the other hand, with methods enabling the use of material in pieces, it is not possible to record completely the Debye registration, so that it is necessary to use separate test material for the exact measurement of the lattice constants. Also the identification of parts of the structure is very difficult and often impossible.

According to this invention, it will be possible to use a single sample of the material to be examined, the piece of material being provided with a plane surface, and to record a complete Debye picture on one film only. The method of my invention is suited for the analysis of material in piece and powdered form.

For use in radiographic-metallographic research and analysis work, the new method has the following advantages:

1. It makes it possible to record all interference lines by using as samples pieces of the material to be tested, e. g. after metallographic grinding. Therefore, it is possible to identify all parts of structure, and it is certain that the fine structure of the sample will be the same as the structure of the material.

2. The preparation of the material to bring it into rod form is not necessary which is very convenient for metallographic analyses.

3. Boring the preparation is not necessary, so that the examination is considerably accelerated.

4. The recording of all interference lines makes it possible to take advantage of asymmetric positions of the film, i. e. to measure lattice constants very precisely without test material, the interference lines of which complicate the Debye recording.

5. The principal parts of the film chamber can also be used for other radiographic methods, e. g. for the method of rotating crystals, etc.

6. The simple manipulation of the apparatus of my invention makes it possible that it be used even by less trained personnel.

7. Under proper focusing conditions great sharpness of the interference lines is attained which makes possible the exact measurement of bending angles.

Other characteristics of the invention are evident from the following description.

In the drawing a constructional form of the invention is shown by way of an example.

Fig. 1 represents an axial section through the film chamber, Fig. 2 is the arrangement for exposure in the region of small angles and Fig. 3 is the arrangement for recording the region of large angles.

The film chamber consists of a cylindrical chamber 1 with cover 2, in which is placed the turning tap 3 provided at the top with an angle head 4. The turning tap has at the lower end a test sample 5 fastened thereto, the tap being exactly in the axis of the chamber.

In the wall of the chamber is a diaphragm through which the primary X-rays 6 enter. The film 7 is pressed against the inside of the cylindrical chamber wall by means of usual spring rings. During the exposure in the region of small angles, the region of large angles is screened by the screen 8, the form of which is also cylindrical.

The screen is supported by three taps 9 passing through the cover and being held together at the top by a ring 10. The holes through which the taps pass have felt washers which prevent the entrance of visible light into the chamber. In a known manner, opposite to the diaphragm 6 is a fluorescent screen member which serves to place the camera correctly with respect to the primary X-ray beam.

Figs. 2 and 3 are explanatory of the recording of the complete Debye registration by using a piece of material or material in powdered form. Fig. 2 shows the position of the sample during the exposure in the region of small angles. Usually only one exposure is necessary for the position designated I in which the region of the angles $O_1$ is recorded.

If the exact measurement of the reflected radiation and, therefore, of the lattice constants is to be made, then it is necessary to make two exposures in the region $O_1$ in the position I and in the region $O_2$ in the position II of the sample. The region of the large angles is at the same time screened by the screen 8, and the remaining region of the small angles is screened by the sample itself.

During each of these exposures, the incline of the plane of the sample in regard to the axis of primary X-rays must be such that the Bragg focusing condition:

$$\frac{\sin \alpha}{\sin \beta} = \frac{a}{b}$$

is fulfilled, and the place corresponding to this condition is chosen in the middle of the region of interference lines of small angles.

The distance between the end of the diaphragm of the primary X-rays and the middle of the chamber is given by Glocker's focusing condition for the perpendicular position of the plane with respect to the axis of primary X-rays which is represented in Fig. 3. In this position of the sample, the remaining region of the large angles will be exposed whereby the screen 8 is removed. The position of the diaphragm for the primary X-rays is chosen between the angle $\vartheta=82°$ (convenient for the exact measurement of lattice constants where it is necessary that the last lines also are as sharp as possible) or the place in the middle of the region of the large angles $\vartheta$, i. e. $\vartheta$ 68° (convenient for the identification of crystalline parts of the examined material).

For an exact measurement of the lattice constants, the film 7 is placed asymmetrically, i. e. the ends of the rolled film are at right angles to the axis of the beam of the primary X-rays. Thus it is possible to utilise all the advantages of the asymmetric method of Straumanis-Ievins (see "Die Praezisionsbestimmung von Gitterkonstanten nach der asymetrischen Methode" by these authors, publishers Julius Springer, Berlin 1940).

I claim:

1. Method of radiographic examination of materials with the aid of X-rays, the X-rays being reflected by test material on a photographic layer, comprising cylindrically arranging a photographic film, rotatably suspending the test material in the axis of the cylinder of the photographic film, holding the test material stationary during the exposure, and providing a movably arranged cylindrical screen to protect the photographic layer against recording an undesired region of reflected angles.

2. Method of radiographic examination of materials with the aid of X-rays, comprising cylindrically arranging a photographic film, providing a sample of material with a plane surface, rotatably arranging the test material in the axis of the cylinder of the photographic film, placing said plane surface in the path of an incident X-ray beam, placing the part of said plane surface, which is struck by X-rays, to lie in the axis of rotation of the test material, holding the test material stationary during the exposure, and protecting the photographic film by means of a longitudinally movable cylindrical screen against recording the region of large reflected angles.

3. In the method according to claim 2, providing the screening of the region of reflected angles larger than 45°.

4. Apparatus for radiographic examination of materials with the aid of X-rays, comprising a cylindrical chamber provided with a cover and an inlet window for the primary X-rays, the inner wall of the chamber constituting a support for a photographic film, means for rotatably holding the test material in the axis of the chamber, a movably arranged cylindrical screen within the chamber, and a support for said screen, said means including a tap passing through the cover and being rotatably held in the cover, said tap holding the test material at its lower end, and said support including taps passing through said cover for raising and lowering the screen.

ALOIS DVOŘÁK.

REFERENCES CITED

The following references are of record in the file of this patent:

UNITED STATES PATENTS

| Number | Name | Date |
|---|---|---|
| 1,589,833 | Behnken et al. | June 22, 1926 |
| 2,317,329 | McLachlan, Jr. | Apr. 20, 1943 |
| 2,417,657 | McLachlan, Jr. | Mar. 18, 1947 |

FOREIGN PATENTS

| Number | Country | Date |
|---|---|---|
| 462,522 | Great Britain | Mar. 10, 1937 |

OTHER REFERENCES

X-Rays in Practice by W. T. Sproull, 1946 ed. McGraw-Hill Book Co. N. Y. pgs. 404–405.